Sept. 15, 1953         H. W. PRICE         2,651,948
TRANSMISSION OPERATING MECHANISM
Filed June 26, 1948                                    2 Sheets-Sheet 1
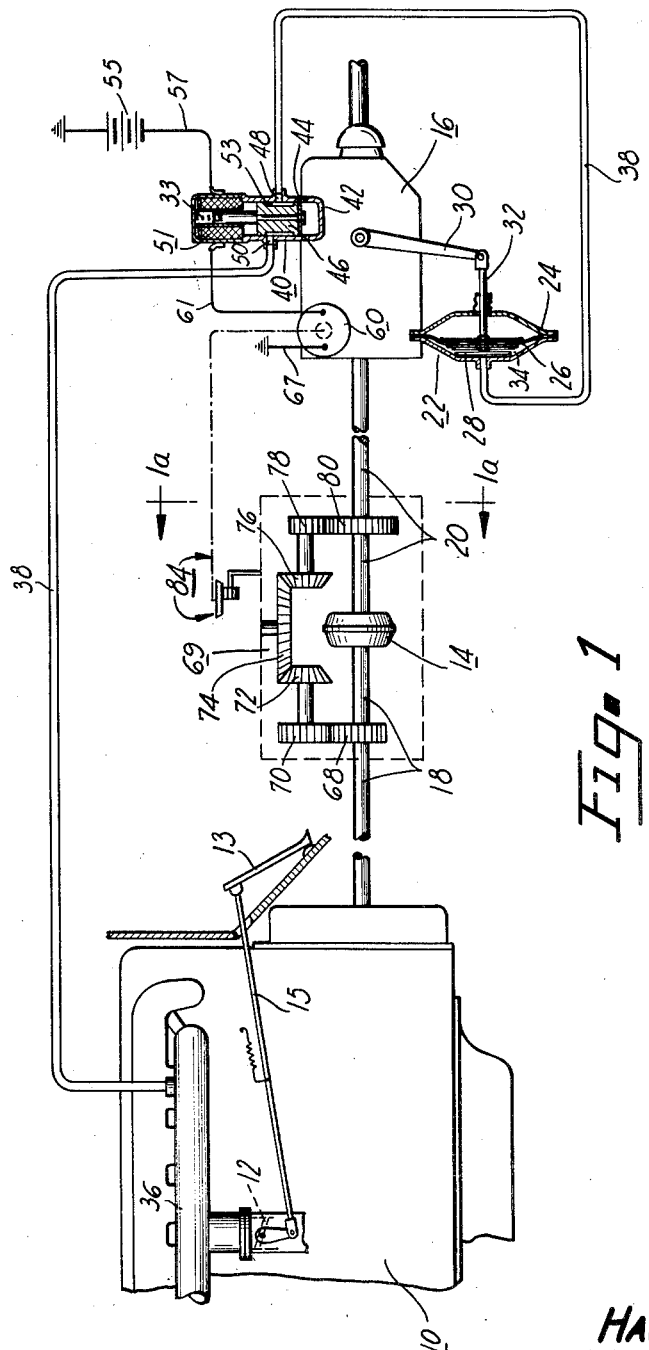
INVENTOR.
HAROLD W. PRICE
BY
H.O. Clayton
ATTORNEY Sept. 15, 1953    H. W. PRICE    2,651,948
TRANSMISSION OPERATING MECHANISM
Filed June 26, 1948    2 Sheets-Sheet 2
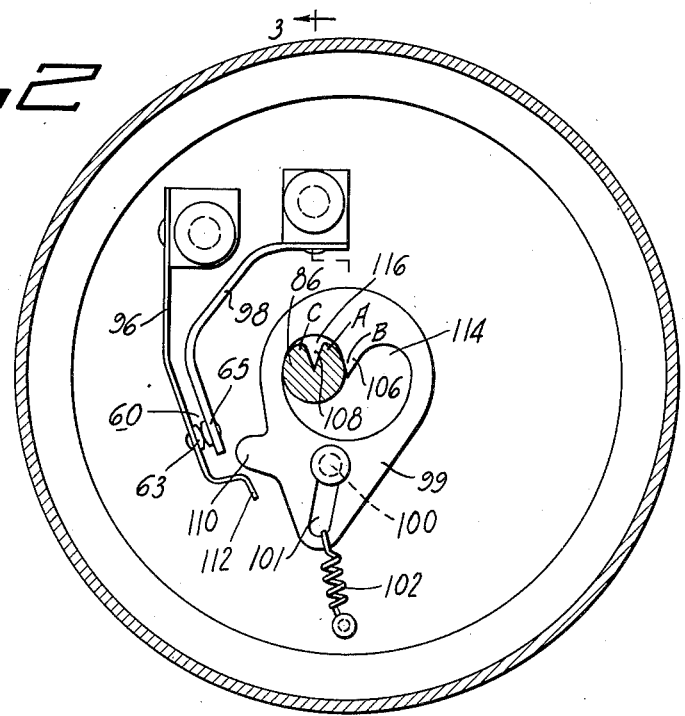
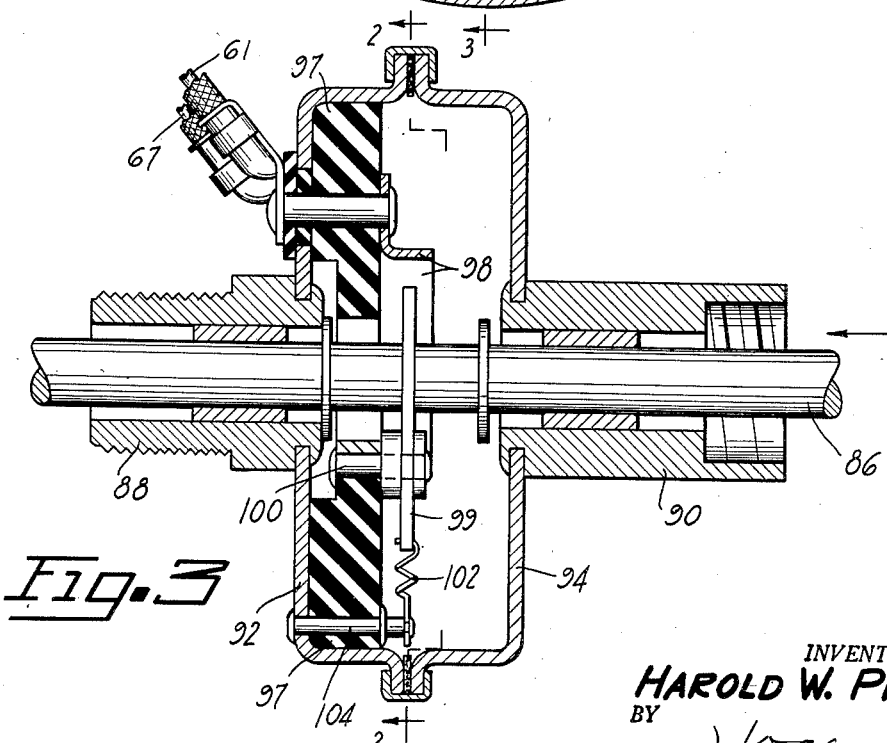
INVENTOR.
HAROLD W. PRICE
BY
H.O.Clayton
ATTORNEY Patented Sept. 15, 1953

2,651,948

UNITED STATES PATENT OFFICE 2,651,948

TRANSMISSION OPERATING MECHANISM

Harold W. Price, Bradenton, Fla., assignor to Bendix Aviation Corporation, South Bend, Ind., a corporation of Delaware Application June 26, 1948, Serial No. 35,369

3 Claims. (Cl. 74—731)

1

This invention relates to power transmission devices and an improvement in power transmitting devices especially adapted to use in connection with motor vehicles although not necessarily limited thereto.

It is desirable, in connection with the drive for motor vehicles, to provide a speed ratio changing transmission for varying the driving ratio between the engine and the motor driven rear wheels of the vehicle; and my invention is particularly related to motor vehicles having speed ratio changing transmissions. In its more limited aspects my invention is further particularly related to improvements in motor vehicles having speed ratio changing transmissions of the torque converter type.

Yet another object of my invention is to provide an improved drive system for the power plant of an automotive vehicle said system including a fluid type of torque converter in combination with a step type transmission, preferably of the two speed type. An important object of my invention is to provide automatically operated power means for operating this transmission said power means being controlled by means operative in accordance with the speeds of the driver and follower of said converter. Such a mechanism provides great flexibility of car control with very little effort. The vehicle may be driven without manipulation of a clutch pedal or a gear shift lever and at the same time afford flexibility of car control best suited to the changing requirement of torque multiplication and other power transmitting characteristics.

A further object of my invention is to provide a power transmission system well suited for heavy duty vehicles such as buses or trucks said system being controlled in part by an operation of the accelerator of the vehicle and including the combination of a torque converter and a change speed transmission the latter supplementing the torque converter to provide the necessary speed ratio between the internal combustion engine and the driven wheels of the vehicle. Such a power transmission mechanism provides means for obtaining the desired speed of the bus or truck from a standing start without danger of either stalling the engine or subjecting the vehicle to an undesirable acceleration, that is, jerking action; and this mechanism, by virtue of the increase in force acting upon the rear wheels, expedites the operation of placing the car in motion.

My invention also contemplates the provision of a power plant adapted for use in an automotive vehicle said plant including a prime mover, a manually operable member, such as an accelerator, for controlling the operation of the prime mover, a driven element, such as a propeller shaft, and change speed transmission mechanism interconnecting the prime mover and driven element including a driving element, a driven element, a change speed transmission unit, and power means, operative in accordance with the relative speeds of the latter driving element, and latter driven element, for controlling its operation of the change speed transmission unit.

Yet another object of my invention is to provide a change speed transmission mechanism adapted to interconnect a prime mover, such as the internal combustion engine of an automotive vehicle, with a driven element, such as the propeller shaft of an automotive vehicle, said transmission mechanism including a change speed transmission unit operated by power means the latter being automatically operative to effect a certain setting of the transmission unit when the speed of the driven element exceeds the speed of the driving element; and also automatically operative to effect another setting of the transmission unit when the speed of the driving element exceeds the speed of the driven element.

The above and other objects and features of the invention will appear more fully hereafter from a consideration of the following description taken in connection with the accompanying drawings wherein one embodiment of the invention is illustrated by way of example.

Figure 1 is a diagrammatic view of the change speed transmission mechanism constituting my invention; and Figure 1a is a view disclosing, in side elevation, a portion of the gears of the differential gear mechanism of Figure 1;

Figure 2 is a sectional view taken on line 2—2 of Figure 3 disclosing details of an escapement switch constituting one of the controls of my invention; and Figure 3 is a sectional view, taken on the line 3—3 of Figure 2, disclosing other details of escapement switch of Figure 2.

There is disclosed in Figure 1 a preferred embodiment of the power plant constituting my invention, said plant being adapted to be used in an automotive vehicle. As disclosed in this figure an internal combustion engine 10, controlled in part by a throttle valve 12, is drivably connected to the rear wheels of the vehicle, not shown, by power transmitting means including change speed transmissions 14 and 16. The throttle 12 is actuated by an accelerator 13 which is connected to the throttle by a rod 15.

The transmission 14 may be of any type which is automatically operable, in accordance with the relative speeds of a power input shaft 18 and a power output shaft 20 of the transmission, to change the driving ratio of said shafts. Preferably the transmission 14 is of the fluid type torque converter including a driving rotor or driver, not shown, connected to the input shaft 18 and a driven rotor or turbine, not shown, connected on the output shaft 20. The driven rotor may also be defined as a follower.

If the change speed transmission mechanism of the power plant were limited to the automatically operable transmission 14 then the driving ratio would be limited to a certain factor say 2.7; however, this driving ratio is inadequate with heavy duty vehicles, such as large buses and trucks, to effect the desired acceleration and speed of the vehicle. To expedite the operation of placing the car in motion there is provided, by my invention, a supplemental change speed transmission such as the transmission 16. This transmission 16 is preferably of the step type such as that incorporated in many two-speed axles of the day; however, the transmission 16 is not necessarily limited to this type of unit.

With the change speed transmission mechanism of my invention the transmission 16 is automatically operated in accordance with the relative speeds of the driving and driven coaxial shafts 18 and 20 of the transmission 14 the upshift, that is, high gear operation of the transmission 16 being automatically effected when the speed of the shaft 20 exceeds the speed of the shaft 18; furthermore, with the mechanism of my invention the downshift, that is, low gear operation of the transmission 16, is automatically effected when the speed of the shaft 18 exceeds the speed of the shaft 20.

To the above end there is provided power means for operating the two-speed transmission 16 of Figure 1 said power means preferably including a single acting pressure differential operated motor 22 comprising a casing 24, a power element 26, and a spring 28 the latter being operable when expanded to establish the transmission in its low gear setting. The power element 26 of the motor is preferably connected to a transmission operating crank 30 by a rod 32. A control compartment 34 of the motor 22 is outlined by one end of the casing 24 and the power element 26 and said compartment is placed in air transmitting connection with the intake manifold 36 of the engine 10 by a conduit 38.

The flow of air into and from the motor compartment 34 is controlled by a solenoid and spring operated three-way valve 40 which is incorporated in the conduit 38. This valve preferably includes a casing 42 which houses a reciprocable valve member 46; and said casing is preferably ported at 44 to provide a vent to the atmosphere. A valve 46 is moved upwardly by a solenoid 51 to interconnect the motor compartment 34 with the intake manifold 36 to effect an energization of the shifter motor 22. The body of the valve member 46 is provided with a recess 53 which serves to place ports 48 and 50 in the valve casing in air transmitting connection with each other when said valve member is moved upwardly by the energized solenoid. The vent port 44 is at this time out of registry with the recess 53. When the solenoid 51 is de-energized a spring 33 operates to move the valve member 46 downwardly to interconnect the ports 44 and 48 to vent the compartment 34 to the atmosphere thereby permitting the motor spring 28 to expand to effect the low gear setting of the transmission 16. The port 50 is at this time out of registry with the recess 53. In Figure 1 the valve member 46 is disclosed in position to effect the energization of the motor 22 accordingly the motor piston 26 is disclosed in position to effect the high gear setting of the transmission 16.

The electrical mechanism for controlling the operation of the solenoid 51 preferably includes a grounded battery 55 wired to the solenoid by a conductor 57. An escapement switch mechanism 60 disclosed in detail in Figures 2 and 3, serves to control the operation of the solenoid 51 the electrical conductors connected to said switch including a conductor 61, Figure 1, interconnecting a movable contact 63 of the switch with the solenoid, and a conductor 67, Figure 1, grounding a fixed contact 65 of the switch.

That part of the power means for controlling the solenoid 51 constitutes one of the important features of my invention and this control, which may be defined as a gear differential mechanism and which is indicated as a whole by reference numeral 69, is diagrammatically disclosed in Figure 1. Describing this gear differential mechanism a gear 68, drivably connected to the engine driven power input shaft 18, is meshed with a gear 70 the latter serving to drive a planetary pinion gear 72. The latter gear is meshed with a planetary gear 74 which is meshed with another planetary pinion gear 76. The latter gear is drivably connected with a planetary pinion gear 78 which is in mesh with an idler gear 81; and this idler gear is meshed with a gear 80 drivably mounted on the power output shaft 20. To the gear 74 there is connected a force transmitting connection 84 interconnecting said gear with a switch operating drive shaft 86, Figure 3. This connection 84, which may include a Bowden control and intermeshing gears, Figure 1, mounted on the housing cage of the gear mechanism 69, is of such a construction as to effect either a clockwise or counterclockwise rotation of the shaft 86 depending upon the direction of rotation of the cage of the mechanism 69 that is the bodily movement of said cage.

Completing the description of the switch mechanism disclosed in Figures 2 and 3 the driving shaft 86 is journaled in bearings 88 and 90 mounted in casing members 92 and 94 respectively. The movable contact member 63 and fixed contact member 65 of the switch 60, are connected respectively, to yieldable contact support members 96 and 98 secured to a support member 97, Figure 3, of insulation material; and this support member is fitted within and secured to the casing member 92. A cam lever member 99, which may be generally heart shaped in outline, is pivotally mounted on a pin 100, which is mounted in the support member 97 and extends through a slot 101 in the member 99; and the member 99 is provided with a heart-shaped opening thru which extends the drive shaft 86. A spring 102, secured to the switch casing member 92 by a pin 104, is connected to the lower end of the cam member 99 and serves to bias said cam member downwardly so that the pin 100 fits within the upper end of the slot 101. The heart-shaped opening in the cam member 99 provides a wedge-shaped pilot member 106 as a part of said cam member; and this pilot member 106 is adapted, at certain times in the operation of the control mechanism, to nest within a V-shaped slot 108 in the shaft 86. The cam member 99 is provided with a foot member 110 adapted to contact a lower end portion 112 of the contact support member 96 in the operation of opening the switch.

Describing now the operation of the escapement switch 60, counterclockwise movement of the shaft 86, looking in the direction of the arrow, Figure 3, results in a portion A of said shaft moving into contact with the tip portion B of the pilot member 106; and this results in a counterclockwise rotation of the cam member 99 about its fulcrum, that is, its mounting on the pin 100. The switch 60 is, by this operation, opened, inasmuch as the foot member 110 strikes the end portion 112 to bend the member 96 thereby separating the contact members 63 and 65. With the completion of the opening of the switch 60 the cam member 99 is rotated so that the shaft 86 nests within a recess 114 in said member; and said shaft remains so nested to maintain the switch open so long as the shaft is rotating in a counterclockwise direction.

To close the switch 60 it is necessary to reverse the direction of the rotation of the shaft 86 and with this operation a portion indicated by the letter C, Figure 2, strikes the tip B to effect a clockwise rotation of the member 99 to the position disclosed in Figure 2; and this operation results in the opening of the switch 60 the shaft 86 then nesting in a recess of the 116 in the member 99.

Describing the complete operation of the mechanism of my invention it will be assumed that the car is at a standstill with the engine idling. The power input shaft 18 is then rotating and the power output shaft 20 is at rest resulting in an operation of the force transmitting connection 84 and cam 99 to open the switch 60; and this results in a deenergization of the motor 22 to effect the low gear setting of the transmission 16. In this operation the cam 99 rotates counterclockwise to open the switch 60 if it is not already open; and as to the movement of the gears of the differential mechanism 69 the gears 70, 72, 74, 76, and 78 thereof move bodily as a unit around the axis of the shaft 18 and the coaxial shaft 20, and at the same time each of said gears rotates about its own axis. To start the car in motion the driver will then depress the accelerator 13 to open the throttle 12 thereby speeding up the engine and the input shaft 18 connected thereto; and this ultimately results in a rotation of the output shaft 20 the initiation of rotation of said shaft and its speed depending upon several factors including the weight of the loaded vehicle and the speed of the shaft 18. The rotation of the shafts 18 and 20 results in a continued bodily movement of the gears 70 and 78, inclusive, about the axes of the shafts 18 and 20 and a continued rotation of said gears about their own, that is longitudinal, axes; however, during this operation when the force exerted by the gear 76 upon the gear 74 equals the force exerted by the gear 72 upon the gear 74, then the bodily movement of the gears, that is the rotation of the gear cage, ceases.

Continuing the description of the cycle of operations when the speed of the driven shaft 20 is such that the speed of the gear 78 exceeds the speed of the gear 72 then the direction of the rotation of the cage 69 will be reversed resulting in an operation of the switch 60; and this operation of the switch results in an energization of the solenoid 51 to open the valve 40 thereby effecting an energization of the motor 22 to place the transmission 16 in its upshift setting.

Continuing the description of the cycle of operation of the change speed transmission mechanism of my invention the transmission 16 is now established in its high gear setting and with this setting the speed of internal combustion engine 10 is relatively low thereby decreasing the wear of the parts thereof. Should the speed of the vehicle be decreased, such as, for example, when the vehicle reaches the foot of a mountain, then the speed of the output shaft 20 is lowered with respect to the then existing speed of the input shaft 18; and when the speed of the gear 72 exceeds the speed of the gear 76 the gear differential mechanism 69 is automatically operative by virtue of the changing of its direction of rotation as a unit, to effect a reversal of the direction of rotation of the shaft 86, Figure 2, resulting in a downshift operation of the transmission 16. The driver may also effect this downshift operation of the transmission 16 by a speeding up of the operation of the engine as the vehicle is being propelled along the highway this operation being often defined as a kick-down operation of the transmission 16.

There is thus provided a simple but effective power plant well adapted for use in an automotive vehicle said plant including a manually operable control member, such as an accelerator pedal, for controlling the speed of a prime mover; and this prime mover is drivably connected to a driven element, such as the propeller shaft of an automotive vehicle, by a change speed transmission including a supplemental change speed transmission operative in accordance with the relative direction of rotation of the power input and power output shafts of the main change speed transmission mechanism of the power plant that is the transmission 14. With the mechanism of my invention the supplemental change speed transmission is established in a relatively low gear setting, that is, its downshift setting, when the vehicle is at a standstill thereby aiding the main transmission in getting the vehicle under way; and at the desired time the supplemental transmission is automatically established in its high gear setting thereby providing an overdrive effect to cut down the speed of operation of the engine. Thereafter during the operation of the vehicle the supplemental transmission 16 is shuttled back and forth between its low and high settings depending upon the relative direction of rotation of the output and input shafts of the main transmission 14.

With the mechanism of my invention the main transmission 14 may be of any type which is automatically operable in accordance with the relative speeds of rotation of the input and output shafts connected to said transmission; and the supplemental transmission 16 of my invention may be of any step type which may be established in at least two settings. The power means for operating the supplemental transmission may be of any type which is controlled in accordance with relative direction of rotation of the aforementioned input and output shafts of the main transmission.

I claim:

1. A change speed transmission mechanism adapted to be incorporated in the power plant of an automotive vehicle including two separate change speed transmission units, and power means, comprising a fluid pressure motor, for operating one of said units, said power means further including control means for the motor operative in accordance with the relative direction of rotation of the input shaft and output shaft of the other transmission unit, said control means including a rotatable member, force transmitting means interconnecting said input shaft with the rotatable member, other force transmitting means interconnecting said output shaft with the rotatable member, and switch means operatively connected with the latter member, the operation of said switch means being dependent on the direction of bodily movement of the rotatable member.

2. A power plant including a prime mover, a driven element and a change speed transmission mechanism interconnecting the prime mover and driven element and adapted to change the speed ratio between the prime mover and driven element, said transmission mechanism including a torque converter comprising a driver and a turbine, a change speed transmission unit supplementing the operation of the torque converter to effect the desired operation of the transmission mechanism, and automatically operative power means for operating the transmission unit including a pressure differential operated motor, valve means for controlling the operation of the motor, and means for controlling the operation of the valve means including a switch mechanism, a cluster of gears including a rotatable and bodily movable gear for controlling the operation of the switch mechanism, said cluster of gears further including gear means interconnecting the rotatable and bodily movable gear with the driver of the torque converter and gear means interconnecting the rotatable and bodily movable gear with the turbine of the torque converter, the arrangement being such that the bodily movement of the movable gear in one direction operates the switch mechanism to effect a change of speed in the transmission mechanism and bodily movement of the movable gear in the opposite direction operates the switch mechanism to effect another change of speed in the transmission.

3. A power plant including a prime mover, a driven element, and a change speed transmission mechanism interconnecting the prime mover and driven element and adapted to change the speed ratio between the prime mover and driven element, said transmission mechanism including a fluid type of torque converter comprising a driver and a turbine, means interconnecting the prime mover and driver, a change speed transmission unit supplementing the operation of the torque converter in effecting the desired operation of the transmission mechanism, and automatically operative means for operating the transmission unit including a pressure differential operated motor, valve means for controlling the operation of the motor and means for controlling the operation of the valve means including a switch mechanism and means for operating the switch mechanism comprising a cluster of gears each gear of the cluster being rotatable about its own axis and all of the gears of the cluster being bodily movable as a unit, force transmitting means interconnecting one of the gears of the cluster with the means interconnecting the prime mover and driver of the turbine, force transmitting means interconnecting another of the gears of the cluster with the connection between the turbine and the driven element, and force transmitting means interconnecting one of the gears of the cluster with the switch mechanism.

HAROLD W. PRICE.

References Cited in the file of this patent

UNITED STATES PATENTS

| Number | Name | Date |
| --- | --- | --- |
| 1,943,694 | Padgett | Jan. 16, 1934 |
| 2,185,730 | Griswold | Jan. 2, 1940 |
| 2,222,144 | Ferris | Nov. 19, 1940 |
| 2,337,748 | Gsching | Dec. 28, 1943 |
| 2,373,453 | Brunken | Apr. 10, 1945 |